United States Patent [19]

Memon

[11] Patent Number: 5,302,429

[45] Date of Patent: Apr. 12, 1994

[54] THERMOPLASTIC POLYMER COMPOSITIONS CONTAINING HIGH MOLECULAR WEIGHT POLY(VINYL AROMATIC) MELT-RHEOLOGY MODIFIERS

[75] Inventor: Nazir A. Memon, Fallsington, Pa.

[73] Assignee: Rohm and Haas Company, Philadelphia, Pa.

[21] Appl. No.: 795,433

[22] Filed: Nov. 21, 1991

Related U.S. Application Data

[62] Division of Ser. No. 389,662, Aug. 4, 1989, Pat. No. 5,102,952.

[51] Int. Cl.$^5$ .............. B29D 22/00; B32B 27/30; B32B 27/34; B32B 27/36
[52] U.S. Cl. .............. 428/35.7; 428/364; 428/412; 428/473.5; 428/474.4; 428/480; 428/523; 428/36.92; 525/132; 525/146; 525/165; 525/178; 525/185
[58] Field of Search .............. 525/67, 185, 132, 146, 525/165, 178; 428/35.7, 364, 412, 473.5, 474.4, 480, 523

[56] References Cited

U.S. PATENT DOCUMENTS

| | | | |
|---|---|---|---|
| 3,668,274 | 6/1972 | Owens et al. | 260/857 |
| 3,751,527 | 8/1973 | Bortnick | 260/899 |
| 3,864,428 | 2/1975 | Nakamura et al. | 260/873 |
| 3,903,023 | 9/1975 | Boutillier et al. | 260/2.5 |
| 4,001,184 | 1/1977 | Scotte | 260/47 |
| 4,145,466 | 3/1979 | Leslie et al. | 428/35 |
| 4,159,974 | 7/1979 | Mark et al. | 260/30.2 |
| 4,161,579 | 7/1979 | Edelman et al. | 525/444 |
| 4,180,494 | 12/1979 | Fromuth et al. | 260/40 |
| 4,201,848 | 5/1980 | Kotani et al. | 525/314 |
| 4,218,544 | 8/1980 | Henton | 525/67 |
| 4,263,415 | 4/1981 | Liu | 525/148 |
| 4,415,723 | 11/1983 | Hedges et al. | 528/204 |
| 4,537,930 | 8/1985 | Bussink et al. | 524/505 |
| 4,544,706 | 10/1985 | Finch et al. | 525/146 |
| 4,559,388 | 12/1985 | Liu et al. | 525/146 |
| 4,562,231 | 12/1985 | Dean . | |
| 4,585,825 | 4/1986 | Wesselmann | 525/71 |
| 4,587,298 | 5/1986 | Miller | 525/67 |
| 4,622,363 | 11/1986 | Eichenauer et al. | 525/67 |
| 4,774,291 | 9/1988 | Maeda | 525/197 |
| 4,833,223 | 5/1989 | Myers | 526/323 |
| 5,102,952 | 4/1992 | Memon | 525/67 |
| 5,166,238 | 11/1992 | Nakano et al. | 526/348.1 |

FOREIGN PATENT DOCUMENTS

| | | | |
|---|---|---|---|
| 156027A1 | 12/1980 | European Pat. Off. . | |
| 237710A2 | 1/1987 | European Pat. Off. . | |
| 155989 | 10/1987 | European Pat. Off. . | |
| 264792A2 | 10/1987 | European Pat. Off. . | |
| 302509A2 | 8/1988 | European Pat. Off. . | |
| 319113A2 | 11/1988 | European Pat. Off. . | |
| 358135A2 | 9/1989 | European Pat. Off. . | |
| 354802A1 | 8/1991 | European Pat. Off. . | |
| 3601420A1 | 1/1986 | Fed. Rep. of Germany . | |
| 61-1539 | 7/1987 | Japan | 525/80 |
| 61-1540 | 7/1987 | Japan | 525/80 |
| 60-292193 | 7/1987 | Japan | 525/80 |
| 2118193 | 10/1983 | United Kingdom | 525/146 |
| 2220207A | 2/1989 | United Kingdom . | |

*Primary Examiner*—James J. Seidleck
*Assistant Examiner*—Thomas Hamilton, III

[57] ABSTRACT

Vinyl aromatic polymers having a minimum molecular weight of about 500,000, and preferably of about 1,500,000, are blended at levels of from about 1 to about 25% with thermoplastic resins to improve the melt rheology of the thermoplastic resins and facilitate blow molding, thermoforming, extrusion and similar processes.

11 Claims, No Drawings

THERMOPLASTIC POLYMER COMPOSITIONS CONTAINING HIGH MOLECULAR WEIGHT POLY(VINYL AROMATIC) MELT-RHEOLOGY MODIFIERS

This is a divisional of application Ser. No. 389,662, filed Aug. 4, 1989 now U.S. Pat. No. 5,102,952.

This invention relates to melt-rheology modifiers for thermoplastic polymers, and more particularly to high-molecular-weight vinyl aromatic polymers as melt-rheology modifiers, and to the thermoplastic polymers having modified melt-rheology properties.

BACKGROUND OF THE INVENTION

The modified thermoplastic polymer compositions of the present invention are particularly well suited to blow-molding processes, by which thin-walled articles such as bottles of all sizes are formed from a partially shaped, usually hollow polymer article known as a parison. The parison is formed by well-known processes such as extrusion or injection molding; it is then typically placed in a final mold, expanded by gas pressure to conform to the shape of the final mold and cooled to fix its shape. Variations of this process are well known in the art, and it may be used with many thermoplastic polymers. Such polymers that have been used by others to form blow-molded articles include poly(vinyl chloride), or PVC, poly(ethylene terephthalate), or PET, and polypropylene.

Desirably, such polymers balance melt-rheology properties such as flow and sag: the polymer must flow readily enough to be extruded, injection molded or otherwise formed into the parison; it must be sufficiently elastic and thermoplastic to fill the final mold readily under air pressure and heat, and without melt fracture or other surface distortion; yet it must be sufficiently resistant to flow or sag while cooling that the shape of the finished article is retained.

Further, if the polymer may be crystallized, the various processing, blending, and forming operations to which it is subjected must not accelerate crystallization to the point that blow-molding properties are degraded.

This combination of properties is difficult to find in unmodified polymers. Poly(vinyl chloride) may be easily modified with polymers that act as processing aids to make a polymer that is tractable in blow-molding applications, but other polymers have been more difficult to modify satisfactorily. Condensation polymers such as polycarbonates and polyamides and relatively low-molecular weight polymers such as polyethylene terephthalate of molecular weights in the range below about 20,000 have been difficult to modify for blow molding, and polycarbonate resins have proved especially difficult. It further has been difficult to blow-mold blends of engineering resins, such as polycarbonates with aromatic polyesters or with nylon, where both components are of relatively low molecular weight and low melt viscosity in their molten forms.

One approach that has been used to improve the blow-molding properties of polycarbonate resins has been to introduce chain branching into the polycarbonate molecule. Another has been to copolymerize the polycarbonate with a polyester. Neither of these approaches has been entirely successful; particular properties are improved, but the balance of properties important to blow molding is not sufficiently improved.

Branching or increasing the molecular weight of the polymer have been applied to other polymers used in blow molding. Branching is taught for poly(ethylene terephthalate), but requires careful control of melt reactivity to avoid causing processing times to be extended. Polyamides having reactive amine end groups may be reacted with groups on an additive, to tie together the polyamide molecules and effectively raise the molecular weight. This method requires careful control of stoichiometry, and may not be suited to less reactive polymers.

The rheology of polycarbonates has been controlled by additives, but the effects found do not corrolate with the improvement in low-shear and high-shear viscosity taught in the present invention.

Styrene-containing copolymers have been added to polycarbonate resins or polyester-polycarbonate blends as impact modifiers; these copolymers typically possess a core-shell (multi-stage) morphology, and the soluble portions of these copolymers have relatively low molecular weights, generally below about 300,000. Such impact-modifying polymers preferably contain a core (first stage) of rubbery poly(alkyl acrylate) or poly(butadiene) polymer or copolymer which is optionally crosslinked and/or graftlinked, and a thermoplastic hard shell (outer stage) of poly(styrene-co-acrylonitrile) copolymer.

Other impact modifying polymers are methacrylate-butadiene-styrene resins, which are multi-stage polymers having a butadiene polymer or copolymer, optionally containing vinylaromatics, as for examples styrenics, (meth)acrylate esters, or (meth)acrylonitrile, at levels below 30% and optional crosslinking, as a first stage. One or more thermoplastic methyl methacrylate polymer stages containing styrene, lower alkyl (meth)acrylates and/or (meth)acrylonitrile and optionally other monovinyl, monovinylidene, polyvinyl and/or poly vinylidene components are polymerized onto the first stage. Such modifiers are useful for impact-property modification of polycarbonates and polyesters.

Similarly, staged copolymers of crosslinked poly(alkyl acrylates) core//poly(alkyl methacrylates) shell have been combined with polycarbonates, polyesters, polyamides, and other engineering resins. Such core/-shell polymers do not contain the high-molecular-weight vinylaromatic polymer of the present invention; the molecular weight of the extractable poly(alkyl methacrylate) phase is less than 500,000, and the remainder is crosslinked polymer. Such polymers do not function as melt rheology modifiers.

High-molecular-weight polymers have been added to various polymers, as for instance the addition of high-molecular-weight styrene to thermoplastic polystyrene as a foaming-process aid, or the use of high-molecular-weight copolymers of styrene with a minor amount of a nitrile or (meth)acrylic ester, in combination with low-molecular-weight copolymers of styrene with nitrile or (meth)acrylic ester and graft polymers of styrene-methyl methacrylate on a rubbery polymer, for the purpose of raising the softening temperature of polycarbonate resins.

It has not been disclosed that any of such high-molecular-weight polymers will affect the melt rheology of other engineering resins or blends in a way which makes feasible blow molding and other fabrication technology requiring good melt strength at low shear rates.

An object of the present invention is to provide a process for improving the rheological properties of thermoplastic polymer melts, and particularly the blow-molding properties of such melts. A further object is to provide a polymeric additive which improves these rheological properties. Additional objects will be apparent from the disclosure below.

THE INVENTION

I have discovered that high-molecular-weight homopolymers or copolymers of vinyl aromatic monomers having minimum weight-average molecular weights of about 500,000, and, preferably, of about 1,500,000, impart a particularly advantageous balance of melt-rheology properties for various uses, including blow molding, making extruded articles and thermoformable sheet, and making thermoformed articles therefrom, to certain thermoplastic polymers and copolymers. These thermoplastic polymers and copolymers include, but are not limited to, polycarbonates in blends with the thermoplastics listed below; aromatic polyesters including poly(alkylene terephthalates) such as polybutylene terphthalate, polyethyleneterephthalate and the like; poly(aromatic ketones) such as polyether ketone, polyether ether ketone, polyether ketone ketone, polyketone and the like; poly(phenylene ethers); poly(phenylene sulfides); phenoxy resins; polysulfones such as poly(ether sulfone), poly(aryl sulfone), polysulfone and the like; poly(ether imides); poly(ether imide esters); copoly(ether imide esters); poly(ester carbonates); polyarylates such as poly(bisphenol A isophthalate); polyimides such as poly(glutarimides); aromatic polyimides; polyacetals; polyamides including crystalline and amorphous polyamides; poly(amide imides); nitrile resins; poly(methyl pentene); olefin modified styrene-acrylonitrile; styrene-butadiene resins; acrylonitrile-chlorinated polyethylene-styrene resins; thermoplastic elastomers such as poly(ether esters), poly(ether amides), poly(styrene butadiene styrenes) and poly(styrene ethylene-butylene styrenes); and copolymers and blends of the above.

DESCRIPTION OF THE INVENTION

The melt-rheology-modifying (MRM) polymers of the present invention are prepared by free-radical polymerization of vinyl aromatic monomers to minimum molecular weights of about 500,000, and preferably of about 1,500,000. At least about 50%, and more preferably at least about 70%, by weight, of the polymers comprises polymer units from an vinyl aromatic monomer having the formula

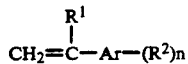

where $R^1$ is H or $CH_3$, n is from 0 to 2, Ar is an aromatic group of from 6 to 10 nuclear carbon atoms, and $R^2$ is the same or different substituent selected from $CH_3$ or $C_1$. Especially preferred are those monomes where $R^1$ is H, Ar is phenyl, n is an integer of 0 or 1, and $R^2$ is $CH_3$. The especially preferred polymers of the present invention are copolymers of at least 75% by weight of styrene, and up to about 25% by weight of acrylonitrile.

As a minor component of the MRM polymers, units from other copolymerizable vinyl monomers may be selected by those skilled in the art. Included among such copolymerizable vinyl monomers are those bearing functional groups, as for example the carboxylic acid groups found in (meth)acrylic acid, as well as non-functionalized monomers such as other vinyl aromatic monomers, vinyl esters, acrylic esters, methacrylic esters, and the like.

The MRM polymers of the present invention may be prepared by any known polymerization techniques, including bulk, solution, emulsion or suspension polymerization. Preferred is conventional emulsion polymerization, using thermal, redox or other known initiation, batch feed or gradual feed, single or multiple staged polymerization, seeded polymerization, and similar variations of this technique which will be apparent to those skilled in the art. The emulsifier may be selected from among those known to be useful in polymerizations; preferred are those which do not degrade the color or stability of the polymer or of the resin to which it is added. Typical of emulsifiers for emulsion polymerization are alkali metal and ammonium salts of fatty carboxylic acids, such as sodium oleate or sodium stearate; salts of disproportionated rosin acids; ethoxylated and/or propoxylated alkyl phenols, such as dodecyl phenol with 1-100 ethylene oxide units; salts of aliphatic or aromatic sulfates such as sodium lauryl sulfate; salts of aliphatic or aromatic sulfonates, such as sodium dodecylbenzene sulfonate; sodium or potassium or ammonium dialkylsulfosuccinates; disodium salts of mono- or dialkylated diphenylether disulfonates; $C_{12}$-$C_{18}$ alkylsulfonates, sulfates, sulfonates, phosphates, or phosphonates based on alkylene oxide adducts of alkylated phenols, such as sodium alkylphenol-(ethylene oxide)1-100 phosphate; and many others known to the art. Combinations of emulsifiers may be employed Preferred are those with sufficient thermal stability that their residues in the isolated acrylic additive can be processed into the matrix resin without deleterious effects on color or stability; such emulsifiers include alkyl, aryl aralkyl, and alkaryl sulfonates, and alkyl, aryl aralkyl, and alkaryl phosphonates. Such an emulsion polymerization allows the preparation of polymer particles having small size, narrow size distribution and high molecular weight, quickly and at high conversions, with minimum residual monomers. One process by which polymers of the preferred molecular weights may be made is taught by Kotani et al. in U.S. Pat. No. 4,201,848, and other processes are known to those skilled in the art. The polymer may be easily isolated from the reaction mixture using known techniques.

The minimum weight average molecular weight ($M_w$) of the MRM polymers of the present invention, as measured by gel permeation chromatography (GPC) techniques, is preferably about 500,000, and more preferably about 1,500,000, and still more preferably about 2,000,000 ($2 \times 10^6$). Below these values the contribution of the polymer to the blow-molding properties of the resin incorporating it is small, although benefits may be recognized from using lower-molecular-weight MRM polymers, as for example those with $M_w$ of about 400,000. Difficulties with preparing extremely high-molecular-weight polymers create a practical upper limit of about ten million for the preferred polymer, although higher molecular weights are contemplated within the scope of the present invention. The preferred MRM polymers are linear or branched, but they are not crosslinked; that is, they are soluble in organic solvents as tetrahydrofuran, toluene, ethylene dichloride and the line. Within the broader aspect of the invention, crosslinked, and especially lightly crosslinked, polymers are also contemplated. Such crosslinking may be introduced by the incorporation of units from polyethylenically unsaturated monomers into the MRM polymer, preferably at levels up to about 5%, and more preferably from about 0.01 to about 0.5%, by weight based on the total MRM polymer weight, or it may be introduced by other techniques known to those skilled in the art, as for example thermal crosslinking or various post-crosslinking techniques.

The MRM polymer of the present invention may be isolated from the emulsion in which it is formed by any of several methods, including coagulation, evaporation, spray drying, or devolatilizing in an extruder followed by pelletization. Preferred are spray drying and coagulation.

The matrix resins into which the MRM polymer of the present invention is incorporated include polycarbonates; polyesters including poly(alkylene terephthalates); poly(aromatic ketones) such as polyether ketone, polyether ether ketone, polyether ketone ketone, polyketone; poly(phenylene ethers); poly(phenylene sulfides); phenoxy resins; polysulfones such as poly(ether sulfone), poly(aryl sulfone), polysulfone; poly(ether imides); poly(ether imide esters); copoly(ether imide esters); poly(ester carbonates); polyarylates such as poly(bisphenol A isophthalate); polyimides such as poly(glutarimides); aromatic polyimides; polyacetals; poly(styrene) including crystal poly(styrene) and high impact poly(styrene); polymers of vinyltoluene or paramethyl styrene; copolymers of styrene or alkyl substituted styrene with acrylonitrile or maleic anhydride; polyamides including crystalline and amorphous polyamides; acrylate-styrene-acrylonitrile resins; acrylonitrile-butadiene-styrene resins; poly(amide imides); nitrile resins; poly(methyl pentene); olefin modified styrene-acrylonitrile; styrene-butadiene resins; acrylonitrile-chlorinated polyethylene-styrene resins; thermoplastic elastomers such as poly(ether esters), poly(ether amides), poly(styrene butadiene styrenes) and poly(styrene ethylene-butylene styrenes); and copolymers and blends of the above. Those matrix resins specifically listed above shall be indicated herein by the term "thermoplastic engineering resins".

For most advantageous results, it is preferred that a copolymer of the vinyl aromatic monomer with a polar monomer be utilized in combination with a polar thermoplastic engineering resin. Thus, a styrene/acrylonitrile copolymer would give a better balance of appearance and properties than a styrene homopolymer in blends with a polyglutarimide.

Using methods known to those skilled in the art, the MRM polymer of the present invention may be incorporated into the matrix resin at from about 1% to about 25% of the total weight of resin plus polymer. Higher levels may be used within the scope of the present invention, but may deleteriously affect the balance of other physical properties, such as the heat distortion temperature, of the resin in specific applications. A more preferred range is from about 1 to about 10%, and still more preferred is from about 5 to about 10%. The MRM polymer may, for example, be incorporated into the resin by blending the MRM polymer, as a dry powder or pellets, with a dry powder or pellets of the matrix resin. Alternatively, if the matrix resin and the MRM polymer have been separately prepared as emulsions, the emulsions may be mixed and isolated as an intimate mixture by conventional methods such as coagulation or spray drying, or as yet another alternative, the emulsions may be isolated separately and sequentially in the same equipment, this process being termed "staged coagulation." As a less preferred method, the monomers used to prepare the MRM polymer may be polymerized in the presence of the matrix polymer, but the polymerization conditions must be carefully controlled, or the molecular weight of the resulting polymer will be too low to be fully effective.

Other additives may be incorporated into the matrix resin prior or subsequent to incorporation of the polymer of the present invention, or they may be incorporated simultaneously, as by coagulating or spray drying mixed emulsions of the MRM polymer and the additives, and incorporating the resulting material into the matrix resin. Such procedures are conventional, and will be readily apparent to those skilled in the art.

These additives may include other polymers useful as impact modifiers, lubricants, flame retardants, blowing agents, antioxidants, light stabilizers, heat stabilizers, and the like. The blends may also contain fillers such as calcium carbonate, reinforcing agents such as coupled mica, fibers such as glass fibers, and the like.

The core/shell impact-property modifiers, such as those based on alkyl acrylate or butadiene cores and methacrylate or styrene-acrylonitrile shells are conveniently prepared by emulsion polymerization and isolated by any of several techniques known to those skilled in the art, including coagulation, spray drying or other evaporative techniques such as extruder coagulation with dewatering and pelletization as taught by Bortnick in U.S. Pat. No. 3,751,527. These impact-property-modifying polymers may be stabilized with additives during isolation and may be further treated, as by partial fusing or pelletization, for ease of handling or blending The MRMs of the present invention may be combined with the core/shell impact-property modifier in emulsion form and co-isolated, or they may be separately admixed with the matrix resins.

Blowing agents include chemical blowing agents, such as azodicarbonamides, added to or blended with the molten polymeric mixture, followed by processing of the molten blend under conditions sufficient to decompose the chemical blowing agent prior to exit of the molten polymer from the processing apparatus.

Agents also include gaseous blowing agents, such as nitrogen, added to the molten polymer blend prior to exit of the molten polymer from the processing apparatus.

These chemical or gaseous blowing agents will produce a foamed blow-molded, thermoformable or thermoformed article, depending on the fabrication process chosen. By "foamed" is meant an internal foamed structure with cell sizes sufficient to decrease weight substantially, but small and uniform enough to allow support for load-bearing from the polymer surrounding the open cells.

A significant use of the resins which incorporate the MRM polymer of the invention is in the preparation of useful articles by extrusion blow molding, but the enhanced melt strength imparted by the MRM polymers will also be advantageous in preparing useful articles by processes such as injection blow molding, thermoforming and stamping processes on polymer sheet, molding of foamed polymers, extrusion of profile, such as foamed profile, sheet, rods, or tubes, and the like, performed upon resins containing the MRM polymers of this invention. The resins which incorporate the MRM polymer will also be advantageous in other applications where high melt strength is a desirable property. Other uses will be readily apparent to those skilled in the art.

Useful articles which may be made from the resins which incorporate the MRM polymer of the present invention include items for automotive use, such as bumpers, spoiler panels, dashboard panels, rear window panels, external air spoilers, seat backs, truck bed liners, wind deflectors, motorcycle fairings and skirtings and the like. Further uses may include toys, such as tricycles, surfboards, exercise equipment, television housings, other equipment housings, such as typewriter cases, and the like. Still further uses include containers such as bottles, tanks for organic or inorganic liquids, and the like. The formed materials may be useful in buildings, such as decorative or tough protective panels, thermoformed panels, seating construction, pipe, profiled shapes for window and door construction and the like.

Foamed articles such as sheet, rods, tubes, and especially profile will be useful where the shape retention and load-bearing properties of the engineering resin are maintained but with a lighter weight construction; such uses will include panels, equipment housing, window and door frames, toys, automotive uses, athletic equipment, and the like. Many other uses for such tough, heat resistant, readily blow-molded, thermoformed or otherwise processed plastics having high melt strength will be readily apparent to those skilled in the art.

All percentages and ratios given herein are by weight, unless otherwise stated, and all reagents are of good commercial quality unless otherwise stated.

Extrusion sag time was determined by horizontally extruding a strand of polymer from a Killion 25-mm extruder operating at a rate of 60 rpm, through the specified die at the specified temperature. The time for the strand to sag to a point 1.00 meter below the die was recorded in seconds. This test is an excellent indicator of the achievement of melt strength (low shear viscosity) adequate for the commercial processing operations described herein.

The following abbreviations are used to indicate monomer components of the polymers in the following examples:
MMA—Methyl Methacrylate
EA—Ethyl Acrylate
St—Styrene
AA—Acrylic Acid
AN—Acrylonitrile
BA—n-Butyl Acrylate
BMA—n-Butyl Methacrylate In the examples and elsewhere in the specification and claims, all ratios and percentages are by weight unless otherwise indicated, and all reagents are of good commercial quality unless otherwise indicated. In all emulsion preparations, the water used is deionized water.

The following examples are intended to illustrate the invention, and not to limit it.

EXAMPLE 1

This example illustrates the preparation of a high-molecular-weight vinyl aromatic MRM polymer having an overall composition St/MMA=55/45, and molecular weight, $M_w = 2.0 \times 10^6$.

To a 3-neck, 5-liter flask equipped with a stirrer, reflux condenser and nitrogen sweep was added 1527 g water, 3.34 g of 10% acetic acid, and 63.7 g of a 10% solution of the disodium salt of monododecyl diphenylether disulfonate as emulsifier; the emulsifier was rinsed into the vessel with an additional 30 ml of water. The contents of the vessel were adjusted to 46° C. A mixture of 0.01 g ferrous sulfate hydrate and 0.1 g of disodium ethylenediamine tetracetic acid dissolved in 30 g of water was added to the reactor and stirred for two minutes. Then 47.4 g of a 1% solution of sodium formaldehyde sulfoxylate was added to the vessel. After two minutes, a mixture of 236.3 g methyl methacrylate and 288.7 g styrene was added; the monomers were rinsed into the vessel with an additional 25 ml of water. After stirring for three minutes, 10 g of a 5% solution of sodium persulfate was added to the vessel, followed by 0.35 g t-butyl hydroperoxide (70% active). Polymerization was evidenced by a rise in temperature of the vessel contents, beginning about fifteen minutes after the initiator was added, with a peak temperature of about 62°–65° C. The vessel contents were then cooled to 40° C. An additional 116.3 g of 10% emulsifier solution were rinsed into the vessel with 30 ml water, followed by 44.9 g of 1% sodium formaldehyde sulfoxylate solution; the vessel contents were then stirred for two minutes. A mixture of styrene (536.3 g) and methyl methacrylate (438.7 g) were added and rinsed into the vessel with 25 ml water. The temperature was adjusted to 36° C. and 0.48 g t-butyl hydroperoxide was added. After the exotherm peak, the vessel was cooled to room temperature, and a latex having 44.0% solids was removed from the vessel.

EXAMPLES 2-14

These examples illustrate the improvement in extrusion sag time when a high-molecular-weight styrene resin was blended with a mixture of polycarbonate and poly(butylene terephthalate).

The latex from Example 1, as well as those of related compositions prepared by a similar process and described in the following examples, was isolated by spray-drying, and the resulting MRM polymers melt blended, in a 25-mm Killion extruder at 249° C., into a stabilized, 43/57 blend of poly(butylene terephthalate) (PBT) having an intrinsic viscosity, measured in 60/40 phenol/tetrachloroethane, of 1.1 dl/g at 25° C., with branched aromatic polycarbonate as described in U.S. Pat. No. 4,001,184, having an intrinsic viscosity, measured in methylene chloride, of 0.5 dl/g at 25° C., and marketed as Lexan 151 (PC), containing 18% (based on the PBT+PC weight) core-shell impact-property modifier having a core (77.5 parts) polymerized from 71 parts butadiene, 3 parts styrene, 4 parts methyl methacrylate and 1 part divinylbenzene; a second stage polymerized from 11 parts styrene; and a shell polymerized from 11 parts methyl methacrylate and 0.1 parts 1,3-butylene glycol dimethacrylate. The molecular weight of the soluble methacrylic polymer extracted from this modifier was below 500,000; the remainder of the modifier was highly crosslinked and insoluble in organic solvents. Extrusion sag times were determined for these blends, and are shown in Table I.

In all examples, 800 parts of the PC/PBT blend and 150 parts of the MBS modifier were present. In the control (Example 14), an extra 50 parts of the PC/PBT blend were present; in all other cases, 50 parts of a high molecular weight styrene copolymer were present.

TABLE I

| Example | Styrene Copolymer | Extrusion Sag Time, sec. | $M_w \times 10^{-6}$ |
|---|---|---|---|
| 2 (Ex. 1) | St/MMA (55/45) | 24.1 | 2.0 |
| 3 | Styrene homopolymer | 22.6 | 1.6 |
| 4 | St/MMA (95/5) | 23.3 | 1.9 |
| 5 | St/MMA/BA (70/15/15) | 25.5 | 1.6 |
| 6 | St/MMA/MAA (70/15/15) | 32.8 | 1.6 |
| 7 | St/IPN (95/5) | 23.7 | 0.8 |
| 8 | St/MMA/AN (65/10/25) | 19.6 | — |
| 9 | St/AN (95/5) | 21.4 | 1.3 |
| 10 | St/AA (95/5) | 25.1 | 1.7 |
| 11 | St/MMA (80/20) | 22.0 | 1.4 |
| 12 | St/MMA/BA (60/36/4) | 21.8 | — |
| 13 | St/CHMA (80/20) | 27.4 | 1.5 |
| 14 | NONE (control) | 15.8 | — |

IPN is isopropyl naphthalene; CHMA is cyclohexyl methacrylate. The MRMs of Examples 6 and 10 were prepared with sodium dodecylbenzenesulfonate as emulsifier.

EXAMPLES 15-18

In these examples are shown the improvements in extrusion sag time when vinylaromatic MRM polymers were added to a commercial blend believed to contain poly(phenylene ether)//high impact polystyrene, known as Noryl PX-1222 (General Electric). The MRM polymers were made by the process of Example 1. Processing and testing for sag was measured, utilizing a 1.59-mm die at a barrel temperature of 232° C. The blends contained 450 parts of the matrix Noryl blend and 50 parts of the MRM. The results are shown in Table II.

TABLE II

| Example | Styrene Copolymer | Extrusion Sag Time, sec. | $M_w \times 10^{-6}$ |
|---|---|---|---|
| 15 | St homopolymer | 39.6 | 1.6 |
| 16 | St/MMA/MAA (80/15/5) | 46.8 | 1.6 |
| 17 | St/AN (75/25) | 46.8 | 2.2 |
| 18 | — | 20.6 | — |

EXAMPLES 19-20

These examples illustrate improvement in sag flow time imparted to a commercial acrylonitrile-butadiene-styrene (ABS) polymer by a high-molecular-weight MRM polymer. The MRM polymer was that used in Example 17. The ABS polymer was supplied from Borg-Warner as Cyclolac HIL-1000; it is believed to be a blend of styrene/acrylonitrile copolymer with a graft polymer of styrene/acrylonitrile onto a poly(butadiene) rubber. Extrusion sag was measured as in Examples 15-18. The extrusion sag time for the control with no MRM additive (Example 19) was 11.3 seconds; for the blend with 10 wt. % of the MRM (Example 20), the sag time was 17.1 seconds.

EXAMPLES 21-22

These examples illustrate the ability of a MRM to enhance the melt strength of a resin sufficient to form foam of acceptable cell size and load-bearing strength. A blend of the modifier of Example 6 (10 parts per hundred parts of matrix) with the matrix blend of polycarbonate/ poly(butylene terephthalate)/ MBS impact-property modifier of Examples 2-14 was prepared; the blend also contained 1 part of azodicarbonamide, a chemical blowing agent. The blend was processed in a Haake Rheocord mixer at a melt temperature of 247° C. at 60 rpm and extruded through a 6.35 mm. die. On exiting the die, the strand (Example 21) foamed to a diameter of 9.9 mm. The foamed extrudate had acceptable strength and surface. A control without the MRM processed in a similar manner (Example 22) had poorer strength and surface, and had expanded to a diameter of 8.8 mm.

I claim:

1. A blow-molded article formed from a polymer blend which comprises a thermoplastic engineering resin selected from the group consisting of polycarbonate/aromatic polyester blends, polyesters, poly(aromatic ketones), poly(phenylene ethers), poly(phenylene sulfides), poly(aromatic sulfones), poly(ether-imides), polyactals, poly(aromatic imides) polyamides, poly(amide-imides), copolymers and blends thereof from about 1 to about 25%, based on the total weight of the blend, of a vinyl aromatic polymer of units of one or more copolymerizable vinyl monomers, wherein at least 50% by weight of the units have the formula

where $R^1$ is H or $CH_3$, n is an integer of from 0 to 2, Ar is an aromatic group of from 6 to 10 nuclear carbon atoms, an $R^2$ is the same or different group selected from $CH_3$ or Cl having a minimum weight-average molecular weight of about 1,500,000.

2. The article of claim 1 formed by extrusion blow molding.

3. The article of claim 1 formed by injection blow molding.

4. The article of claim 1 wherein the article is a container.

5. The article of claim 1 wherein the article is an automotive bumper.

6. The article of claim 1 wherein the article is an automotive body panel.

7. The article of claim 1 wherein the article is an architectural wall panel.

8. An extruded article formed from a polymer blend which comprises a thermoplastic engineering resin selected from the group consisting of polycarbonate/aromatic polyester blends, polyesters, poly(aromatic ketones), poly(phenylene ethers), poly(phenylene sulfides), poly(aromatic sulfones), poly(ether-imides), polyacetals, poly(aromatic imides), polyamides, poly(amide-imides), copolymers and blends of the above, the blended therewith from about 1 to bout 25%, based on the total weight of the blend, of an vinyl aromatic polymer of units of one or more copolymerizable vinyl monomers, wherein at least 50% by weight of the units have the formula

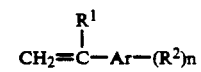

where $R^1$ is H or $CH_3$, n is an integer of rom 0 to 2, Ar is an aromatic group from 6 to 10 nuclear carbon atoms, and R2 is the same or different group selected from $CH_3$ an Cl, having a minimum weight-average molecular weight of about 1,500,000.

9. The extruded article of claim 8 wherein the article is a profile-extruded article.

10. The extruded article of claim 8 wherein the article is a sheet.

11. The extruded article of claim 8 wherein the article is a rod.

* * * * *